(12) United States Patent
Lentz et al.

(10) Patent No.: US 8,128,872 B2
(45) Date of Patent: Mar. 6, 2012

(54) FREEZE INDICATORS, COMPONENTS THEREFOR AND PREPARATIVE PROCESSES

(75) Inventors: Carl Lentz, Washington, PA (US); Dawn E. Smith, Martinsville, NJ (US); Dene H. Taylor, New Hope, PA (US)

(73) Assignee: Temptime Corporation, Morris Plains, NJ (US)

( * ) Notice: Subject to any disclaimer, the term of this patent is extended or adjusted under 35 U.S.C. 154(b) by 22 days.

(21) Appl. No.: 12/511,025

(22) Filed: Jul. 28, 2009

(65) Prior Publication Data

US 2010/0162941 A1 Jul. 1, 2010

Related U.S. Application Data

(60) Provisional application No. 61/084,675, filed on Jul. 30, 2008.

(51) Int. Cl.
*G01N 25/20* (2006.01)
*G01K 11/12* (2006.01)

(52) U.S. Cl. ............... 422/82.12; 422/420; 422/430; 436/147; 436/164; 116/216; 374/106; 252/962

(58) Field of Classification Search ............ 422/82.12, 422/420, 430; 436/147, 164; 116/216; 374/106; 252/962
See application file for complete search history.

(56) References Cited

U.S. PATENT DOCUMENTS

| | | | |
|---|---|---|---|
| 2,971,852 A | 2/1961 | Schulein |
| 4,148,748 A | 4/1979 | Hanlon |
| 4,191,125 A | 3/1980 | Johnson |
| 4,846,095 A | 7/1989 | Emslander et al. |
| 5,137,815 A | 8/1992 | Hendricks et al. |
| 5,223,412 A | 6/1993 | Wight et al. |
| 5,239,942 A | 8/1993 | Ignacio et al. |
| 5,489,521 A | 2/1996 | So et al. |
| 6,472,214 B2 | 10/2002 | Patel |
| 6,837,620 B2 | 1/2005 | Shahinpoor |
| 6,957,623 B2 | 10/2005 | Guisinger et al. |
| 7,343,872 B2 | 3/2008 | Taylor et al. |
| 7,490,575 B2 | 2/2009 | Taylor et al. |
| 7,571,695 B2 | 8/2009 | Taylor et al. |
| 2007/0125296 A1 | 6/2007 | Taylor et al. |
| 2007/0151502 A1 | 7/2007 | Cooperman |
| 2008/0110391 A1 | 5/2008 | Taylor et al. |
| 2008/0257251 A1 | 10/2008 | Taylor et al. |

FOREIGN PATENT DOCUMENTS

| | | |
|---|---|---|
| JP | 10-295374 | 11/1998 |
| WO | WO 2007148321 | 12/2007 |

OTHER PUBLICATIONS

M. Palanisamy, et al., "The effect of water soluble salts on the nucleating ability of the AgI-AgBr-CuI system", Journal of Materials Science 22 (1987) 1335-1340, 1987 Chapman and Hall Ltd.

*Primary Examiner* — Lyle Alexander
(74) *Attorney, Agent, or Firm* — K&L Gates LLP

(57) ABSTRACT

Freeze indicators can include an indicator dispersion, a liquid medium, indicator particles dispersed in the liquid medium and a particulate inorganic nucleating agent to inhibit supercooling of the liquid medium. The inorganic nucleating agent can have an ionic surface coating which can help provide a sharp end point. Optionally, freeze indicators can include indicator particles comprising an organic material and a softener to soften the indicator particles and provide the freeze indication with an enhanced visual appearance. Another option is to provide a temperature-sensitive stabilizer to inhibit coagulation of the indicator dispersion at temperatures above the liquid medium frozen state melting point while permitting coagulation of the indicator dispersion at the liquid medium frozen state melting point.

43 Claims, No Drawings

FREEZE INDICATORS, COMPONENTS THEREFOR AND PREPARATIVE PROCESSES

CROSS-REFERENCE TO A RELATED APPLICATION

This application claims the priority of provisional patent application No. 61/084,675 to Lentz et al. filed Jul. 30, 2008, and the entire disclosure of that provisional application is incorporated by reference herein.

STATEMENT REGARDING FEDERALLY SPONSORED RESEARCH OR DEVELOPMENT (Not applicable.)

TECHNICAL FIELD

The present invention relates to freeze indicators comprising dispersions of solid, semi-solid or liquid particles in a liquid medium, to components of such freeze indicators and to processes for making the components and the freeze indicators. More particularly, but not exclusively, the invention relates to freeze indicators which can provide a reliable indication of the past exposure of a host product to a temperature of about, or below, the freezing point of water or another liquid. The invention includes a freeze-sensitive host product having the freeze indicator associated with it to monitor possible freeze exposure.

BACKGROUND OF THE INVENTION

Many commercial products are temperature sensitive and can spoil, deteriorate or lose quality if they suffer even brief exposure to a temperature near or below freezing. For example, fruits may turn brown, flowers, salad greens and some herbs may wilt and vaccines may lose potency. Other foodstuffs and medications as well as some industrial products, for example latex paints, are also freeze sensitive.

Accordingly there is a need for a low-cost freeze indicator which can be associated with a freeze-sensitive host product, for example by attaching the freeze indicator to the host product, and which can provide an irreversible indication of past exposure of the host product to freezing or near freezing temperatures.

A number of proposals for such freeze indicators is known. For example, U.S. Pat. Nos. 7,343,872 and 7,490,575 and U.S. Patent Application Publications Nos. 2008/0110391 and 2008/0257251, all having inventors Taylor et al. and being assigned to Temptime Corporation disclose a variety of freeze indicators and freeze indicator technologies. These patents and the patent application publications are referenced herein as the "Taylor et al. patent publications", and each one is incorporated by reference herein.

As described in their specifications the Taylor et al. patent publications disclose freeze indicators which employ an indicator element comprising a dispersion of solid particles in a liquid medium. The indicator element can change appearance irreversibly upon exposure to freezing temperatures, for example as a result of coagulation of the dispersed solid particles, providing a signal that the freeze indicator has been exposed to a freezing temperature.

In addition, U.S. Pat. No. 4,191,125 to Johnson and U.S. Pat. No. 5,239,942 to Ignacio et al. disclose freeze indicators comprising frangible ampoules. U.S. Pat. No. 4,148,748 to Hanlon et al. ("Hanlon") discloses a nonreversible freeze-thaw indicator employing a colloidal dispersion of material in latex form. As described in Hanlon, the latex can comprise styrene or other polymers. U.S. Pat. No. 4,846,095 to Emslander et al. and U.S. Pat. No. 5,964,181 to Pereyra disclose freezing point or critical temperature indicators wherein the appearance of a microporous sheet is changed by wetting the microporous sheet with a freeze-sensitive composition. U.S. Pat. No. 6,837,620 to Shahinpoor describes a shape memory alloy temperature sensor that changes shape when exposed to temperatures below a start temperature. U.S. Pat. No. 6,472,214 to Patel describes a freeze monitoring device which comprises an activator solvent which is miscible with water above a threshold temperature and which separates out below a threshold temperature.

Furthermore, U.S. Pat. No. 6,957,623 Guisinger describes a critical temperature indicator which produces a visual, irreversible indication that the indicator has been exposed to a critical temperature such as a temperature near the freezing point of water. As described, Guisinger's critical temperature indicator includes a transformable material including a mixture of water, a nucleating agent, latex, and a stabilizer for the nucleating agent. As described, in the patent, the latex can be a wax. Also, the nucleating agent can be an ice nucleating active (INA) microorganism and the water can comprise deuterium oxide.

U.S. Pat. No. 5,223,412 to Wight et al., U.S. Pat. No. 5,137,815 to Hendricks and U.S. Pat. No. 5,489,521 to So et al., describe ice nucleating agents and microorganisms that can be employed as ice nucleating agents.

Notwithstanding the foregoing proposals for freeze indicators it would be desirable to have a freeze indicator having new response characteristics.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

The present invention provides freeze indicators having new or improved components which can help provide the inventive freeze indicators with various useful characteristics.

Accordingly, the invention provides, in one aspect, a freeze indicator comprising an indicator dispersion. The indicator dispersion can comprise a liquid medium and indicator particles dispersed in the liquid medium. The liquid medium has a melting point which can be determined from the frozen state of the liquid medium. The indicator dispersion can also comprise a particulate inorganic nucleating agent and an ionic surface coating on the inorganic nucleating agent. The ionically surface coated nucleating agent can help inhibit supercooling of the liquid medium. As is understood in the art, supercooling can cause a liquid, for example a freeze indicator liquid medium, to remain liquid at temperatures significantly below the melting point of the frozen state of the liquid medium.

In some cases, the presence of the ionic coating on the nucleating agent can enhance the precision of the freeze indicator. For example, the ionic coating can help provide a freeze indicator with a sharp end point, where there is a relatively narrow temperature difference between the lowest temperature at which the freeze indicator provides no visible response and a temperature which induces freezing in a reasonable period of time.

The indicator dispersion can have a different visual appearance when the liquid medium is in the frozen state, the different visual appearance preferably being irreversible. Optionally, in the frozen state of the liquid medium, occurring for example as a result of exposure of the freeze indicator to a freezing temperature, the indicator particles are coagulated and the coagulated indicator particles provide the different visual appearance.

The liquid medium can be aqueous and the ionic surface coating can comprise a salt, which can be an inorganic salt, for example a chloride. The ionic surface coating can comprise the residue of ionic coating of the inorganic nucleating agent with an aqueous solution of the salt.

The nucleating agent can comprise silver iodide or another suitable nucleating material.

The invention includes a process for preparing the freeze indicator comprising surface-treating the nucleating agent with an aqueous solution of an ionic surface coating material to provide the ionic surface coating on the nucleating agent. The ionically coated nucleating agent can then be incorporated into the indicator dispersion. The process can optionally comprise steeping the nucleating agent in the aqueous salt solution for at least 30 minutes or for another suitable time period.

In another aspect, the invention provides a freeze indicator comprising an indicator dispersion including a liquid medium and organic material indicator particles dispersed in the liquid medium. The indicator dispersion also includes a softener to soften the organic material at the liquid medium frozen state melting point. In the frozen state of the liquid medium the indicator particles can become coagulated providing the indicator dispersion with a different visual appearance wherein the coagulation and the different visual appearance are irreversible. The indicator dispersion can also comprise a particulate nucleating agent to inhibit supercooling of the liquid medium below the liquid medium frozen state melting point, if desired.

Softening of the organic material particles by the softener can result in an enhanced visual appearance of the freeze indicator after freezing as a result of good coalescence of the softened organic material particles. An enhanced appearance, contrasting well with the initial appearance can help provide a clear indication of exposure to freezing conditions.

For some commercial purposes where a substantial shelf life may be desired, and for other purposes it can be useful to have a freeze indicator employing a freeze indicator dispersion of solid particles in a liquid medium wherein the indicator dispersion exhibits good stability at temperatures above freezing but loses stability at freezing temperatures.

Accordingly, in a further aspect, the invention provides a freeze indicator comprising an indicator dispersion wherein the indicator dispersion comprises a liquid medium having a melting point determined from the frozen state of the liquid medium and indicator particles dispersed in the liquid medium. The freeze indicator also comprises a temperature-sensitive stabilizer, optionally in a proportion of from about 0.01 percent to about 5 percent by weight of the indicator dispersion. The temperature sensitive stabilizer inhibits coagulation of the indicator dispersion at temperatures above the liquid medium frozen state melting point yet permits coagulation of the indicator dispersion at the liquid medium frozen state melting point. In the frozen state of the liquid medium, the indicator particles are coagulated and the indicator dispersion has a different and irreversible visual appearance from its initial, pre-frozen appearance.

Because conventional dispersion stabilizers may interfere with coagulation, the invention also provides, in this aspect, temperature-sensitive stabilizers and stabilizer systems which lose their efficacy or lack stabilization efficacy at a desired freezing temperature. For example, a useful temperature-sensitive stabilizer system employed in practicing the invention may have weak or no stabilization efficacy. Some temperature-sensitive stabilization systems according to the invention can include a low-temperature destabilizer to help the indicator dispersion coagulate.

DETAILED DESCRIPTION OF THE INVENTION

The present invention provides, inter alia, freeze indicators that are useful for monitoring past exposure of freeze-sensitive perishable products to freezing temperatures and can have one or more, or all of, a number of characteristics that facilitate the monitoring.

Various useful embodiments of freeze indicator according to the present invention can provide one or more of a variety of new or improved properties including, for example, suitability for mass production at a low cost, a reliable and consistent indicator response and a clear, easily read signal, or indication, of past exposure to freezing conditions. In some embodiments, the indicator signal is long-lasting, or permanent, so that past exposure to ambient freezing conditions can readily be determined by a viewer or a viewing device.

Usefully, the indication of past exposure to freezing can be irreversible. For example, the change in visual appearance can be incapable of being removed by thawing or heating to normal room temperature or to another non-destructive temperature. Such characteristics can permit freeze indicators according to the invention to be usefully employed with a wide range of products including foodstuffs, pharmaceutical and medical products and some industrial products.

Generally, freeze indicators according to the invention comprise a freezable liquid medium and solid particles dispersed in the liquid medium. Desirably, the solid particles coagulate irreversibly when the liquid medium freezes, providing a visible appearance change which may be apparent in the frozen indicator, or which may become apparent after thawing.

To signal past exposure to a freezing temperature, freeze indicators according to the invention usefully have one visual appearance before freezing and a different visual appearance after the indicator has frozen. This appearance change can be provided by coagulation of the solid particles in the dispersion. If desired, a particulate nucleating agent can be included in the indicator dispersion to facilitate or control the coagulation of the solid particles.

The term "solid" is used herein to include "semi-solid" except where the context indicates otherwise.

The terms "coagulate", "coagulating" and "coagulation" are used in this specification to include coalescing, agglomerating and other appearance-changing phenomena that can be exhibited by a liquid dispersion upon freezing, or upon freezing and thawing. Particles of harder materials, for example, colloidal or other particles of inorganic materials such as gold may coagulate or aggregate, being pushed together and increasing in concentration in the liquid medium as the liquid medium freezes. It will be understood that solid particles dispersed in a liquid medium generally are not structurally incorporated into the growing crystals of the liquid medium as it freezes, so that the concentration of the solids in the residual liquid increases as the crystals grow and the volume of unfrozen liquid decreases.

Particles of relatively soft materials such as soft waxes and low glass transition temperature polymers, and the like, may coalesce as they are constrained by the shrinking volume of the crystallizing liquid medium. Some soft materials may coalesce irreversibly, which is useful for the purposes of the invention. However, some harder materials may be capable of redispersing when the frozen liquid thaws if an effective, or overly effective, stabilization system is present. Useful embodiments of the present invention desirably avoid such reversibility.

Desirably, freeze indicator embodiments of the invention have a post-freezing visual appearance which is different from the initial, unfrozen appearance of the freeze indicator and the difference in appearance is irreversible. For example, after once having been frozen, the appearance of the freeze indicator can be permanently different from the initial appearance regardless of whether the freeze indicator has thawed or not. Possibly, the frozen and thawed appearances can be different from each other. Desirably, both the frozen and thawed appearances are distinctly different from the initial appearance. However, the invention also includes embodiments wherein the frozen appearance is similar to the initial appearance, and the thawed appearance is irreversibly different from either the initial or the frozen appearance.

The appearance of a freeze indicator according to the invention can provide a viewer looking at the freeze indicator with an irreversible indication, or signal, of past freeze exposure that enables the viewer to determine whether the freeze indicator has ever been exposed to a freezing event sufficient to cause the freeze indicator to freeze, even if the freeze indicator medium may subsequently have thawed and regained the liquid state, after freezing.

The viewer's interpretation of the indicator signal can be assisted, if desired, by providing one or more reference areas adjacent the freeze indicator's active area with which the viewer can compare the appearance of the freeze indicator. The reference area can help the viewer judge the meaning of the appearance of the freeze indicator, for example to determine whether the appearance indicates "never frozen" or "has been frozen".

Freeze indicators according to the invention can be associated with a host product, for example a freeze-sensitive or freeze-perishable product, to suggest that the host product may also have suffered potentially deleterious freeze exposure.

In general, freeze indicators according to the invention employ a liquid medium as an indicator component which has a melting point that can be determined from the frozen state of the liquid medium and which melting point is at a temperature of interest to indicate. The liquid medium can freeze, and the freeze indicator can display a different appearance, at a temperature reasonably close to the melting point of the liquid medium when in its frozen state. For example, the liquid medium can be water and it may be useful for the freeze indicator to freeze at a temperature near to 0° C., the melting point of ice. The melting point of other liquid media suitable for use in freeze indicators according to the invention, including mixtures, can be determined from reference sources or by simple experimentation, if necessary. One such simple experiment comprises freezing the liquid medium, per se, i.e. without indicator particles, by cooling the liquid medium until it solidifies, and then thawing the solid and observing at what temperature melting commences, the experiment being conducted in a manner pursuant to accepted scientific practice. The observed temperature is then the melting point determined from the frozen state of the liquid medium.

The different appearance can be provided by coagulation of solid particles dispersed in the liquid medium.

The phenomenon of supercooling can make it difficult to construct a freeze indicator responsive to the freezing of a liquid indicator medium which will reliably indicate exposure to a temperature near the melting point of the liquid medium when frozen. This is because some liquids, including water, deuterium oxide and some other aqueous media, can supercool to a temperature significantly below the melting point of the frozen, liquid without solidifying.

Use of a nucleating agent in a freeze indicator dispersion can promote crystallization of a liquid medium, subject to supercooling, at a temperature closer to the melting point of the frozen liquid than would otherwise occur. A nucleating agent can reduce the potential for, or the degree of, or occurrence of, supercooling. The presence of a nucleating agent in the indicator dispersion can narrow the difference between the temperature above the liquid medium melting point where the indicator provides no visible response and a response temperature which induces freezing in a reasonable period of time and provides a change in the visual appearance of the freeze indicator, possibly after thawing.

Also, nucleating agents suitable for use in the practice of the invention can help initiate coagulation or coalescence of the solid particles in the indicator dispersion. Furthermore, a nucleating agent can facilitate the obtaining of a consistent response to a defined temperature event.

In some freeze indicator embodiments of the invention the liquid medium can be aqueous, comprising water. Water exhibits a precise melting point under standard pressure conditions namely 0° C. at one atmosphere. However, the freezing point of water in some circumstance may be significantly below 0° C. owing to supercooling, possibly as much as 10° C., or more, below 0° C. Other aqueous liquids may behave similarly, to a greater or lesser degree.

Because supercooling can influence the temperature at which a liquid freezes, reference is made herein to the melting point of the frozen liquid rather than to the freezing point of the liquid itself. Melting points are generally well known objective numbers which have been, or can be, determined scientifically. The melting points of many solids can be determined with considerable precision. For example, the melting point of ice serves as a temperature standard. As is also well known, some solids, for example some waxes, melt over a temperature range which may be attributable to the complexity of the solid or other factors. For the purposes of the present invention, a sharp melting point is sometimes desirable. However, a small melting point range, for example not more than 0.5° C., or not more than 0.2° C., can also be acceptable in some cases according to the desired sharpness of the indicator response. A greater melting point range may be acceptable in some cases. The suitability of a particular material for employment in a freeze indicator embodiment of the invention can usually be determined, without difficulty, by routine experimentation.

The term "response temperature" is used herein to refer to an ambient temperature which will induce a predetermined appearance change in a particular freeze indicator after a reasonable period of exposure to the ambient temperature, for example a period of 30 minutes or one hour. In practice, quicker response times may be useful, for commercial products, or for test purposes.

The duration of the low temperature exposure required to activate a given freeze indicator includes time for the indicator dispersion to cool to its response temperature, as well as time for freezing to occur. This time may be as little as one or two minutes or as much as 30 or 60 minutes or other suitable time period, depending upon the construction of the indicator and a variety of other factors, as will be understood by those skilled in the art.

As described herein, the invention provides, in one aspect, a freeze indicator comprising an indicator dispersion having indicator particles dispersed in a liquid medium, a particulate inorganic nucleating agent and an ionic surface coating on the inorganic nucleating agent.

Any suitable inorganic nucleating agent can be employed. For example the inorganic nucleating agent can be selected from the group consisting of silver iodide, silver bromide, copper iodide, miersite, mica, bentonite, hectorite, fluorophlogopite, other suitable inorganic nucleating agents that are known or become known to a person of ordinary skill in the art and mixtures of two or more of the foregoing inorganic nucleating agents.

The term "ionic surface coating" is used herein to refer to a coating of an added material, which is different from the inorganic nucleating agent material, and is not merely a layer of ions native to the inorganic nucleating agent material.

Some freeze indicator embodiments of the invention comprise a liquid medium which is aqueous. In such embodiments, the ionic surface coating on the nucleating agent can comprise a salt, for example a salt of a strong inorganic acid and a strong inorganic base. Salts which are highly ionized are desirable. Less ionized salts can also be employed. The salt or salts employed desirably can be salts which do not react covalently with other components of the freeze indicator.

A suitable salt can be selected from the group consisting of the chlorides, fluorides, bromides, iodides, nitrates and sulfates of sodium, potassium, ammonium, lithium and magnesium, mixtures of two or more of the foregoing salts. Salts of other acids and bases including organic acids and/or organic bases can be employed, if desired. Alternatively, or in addition, the ionic surface coating can comprise the residue of ionic coating of the inorganic nucleating agent with an aqueous solution of a salt, for example the residue of ionic coating of the inorganic nucleating agent with an aqueous solution of any one or more of the foregoing salts.

While the present invention is not intended to be limited by any particular theory, it is believed that nucleation of the freezing of a liquid in a metastable or super cooled state, i.e. at a temperature below the melting point of the frozen liquid, occurs via germs or embryos of the solid crystal phase of the liquid. Germs can be considered as small, transient clusters or the like of the newly developing solid phase which may exist in various sizes, dispersed in the parent liquid phase. Under favorable conditions, a germ may grow large enough to become stable, reaching a critical size for stability and thus nucleating growth of the solid, frozen phase.

Heterogeneous nucleation can occur, or can be induced, by the presence of particles of a foreign material in the liquid which provide surfaces for the attachment of germs of the solid crystal phase. For example, ice formation from water, or an aqueous liquid, can be heterogeneously nucleated, by the presence of solid particles of silver iodide or certain microorganisms. As is known, such materials can accordingly be employed as ice nucleating agents.

While known nucleating agents can be helpful in assisting or controlling the freezing process, for use in freeze indicators, it would be desirable to have a nucleating agent that provides improved control of the freezing process with respect to parameters such as alleviation of supercooling, raising of the observed freezing pointing toward the frozen liquid melting point or narrowing of the difference between the observed freezing pointing and the frozen liquid melting point, as well as consistency and reproducibility.

Also according to theory, by which the present invention is not intended to be limited, it is believed that the nucleating capability of a particle may be related to factors such as: the properties of the nucleating surface including surface structure, surface irregularities, singularities, and the like; lattice match and crystallographic symmetry between the nucleating agent and the solid phase to be nucleated; solubility of the nucleating agent in the liquid phase, size of the nucleating agent particle; polarizability, hydrophobicity and hydrophilicity of the nucleating agent particle surface when submerged in the liquid medium; surface charge on the nucleating agent particles; number and strength of surface sites on the nucleating agent particles that are capable of adsorbing molecules of the supercooled liquid. Theoretically, any one or more of these parameters is available for manipulation by a person of ordinary skill in the art seeking to provide a nucleating agent having improved performance.

Silver iodide is known to be capable of providing a useful nucleus for the formation of ice crystals, possibly because silver iodide is water insoluble, has crystallographic properties, such as crystal geometry and size, that are related to those of ice, and because commercially available silver iodide has relatively large crystals.

However, pursuant to the invention, it is also believed that, in freeze indicators according to the invention which employ an aqueous liquid medium, water molecules may be preferentially absorbed at, or become attached to hydrophilic or polar sites on the surface of a submerged solid particle, such as particles of a material introduced into the liquid medium to serve as a nucleating agent. In general, water molecules are not expected to be absorbed or to become attached to hydrophobic sites or nonpolar sites on the particle surface.

One difficulty that can arise in selecting a material to use as a nucleating agent is that many insoluble particulate materials including, for example, silver iodide, may have extensive hydrophobic or nonpolar regions at their surfaces. Such hydrophobicity can be attributed to substantial covalent bonding of atoms of silver and iodine into molecules, rather than ion formation, as well as other factors. Water-insoluble particles are generally not formed of highly polar or ionized materials. Materials that are highly polar or ionized are likely to have good water solubility.

Surprisingly, we have found that an improved nucleating agent can be produced by an ionic coating process comprising ionically coating the nucleating agent with an aqueous solution of an ionic surface coating material to provide an ionic surface coating on the nucleating agent.

The process can comprise steeping the nucleating agent in the aqueous salt solution, optionally, for at least 30 minutes. Steeping can last several hours for example 1 to 2 hours or more if desired and can be conducted at room temperature or other suitable temperature.

If desired, the ionic coating process can include separating the ionically coated nucleating agent from the aqueous salt solution prior to incorporation of the ionically coated nucleating agent into the indicator dispersion. Optionally, the ionic coating process can include drying the ionically coated nucleating agent before incorporating the ionically coated nucleating agent into the indicator dispersion.

Accordingly, in this aspect, the invention can provide simple, economic processes for preparing useful nucleating agents which can be beneficially incorporated into freeze indicators including the novel freeze indicators described herein. Such processes include washing an inorganic or organic nucleating agent with an ionic liquid and optionally stabilizing the surface of the washed nucleating agent, by drying or other suitable means, to provide a treated nucleating agent which can be employed to help control the response temperature of a freeze indicator.

When the liquid medium employed is aqueous, the ionic surface coating can comprise a salt selected from the group consisting of the chlorides, fluorides, bromides, iodides, nitrates and sulfates of sodium, potassium, ammonium, lithium and magnesium, mixtures of two or more of the foregoing salts. Alternatively, the ionic surface coating can comprise the residue of ionic coating of the inorganic nucleating agent with an aqueous solution of a salt or the residue of ionic coating of the inorganic nucleating agent with an aqueous solution of any one or more of the aforementioned salts.

The invention also includes processes for preparing freeze indicators which comprise incorporating the ionically coated nucleating agent into a freeze indicator dispersion. Optionally, such a freeze indicator preparation process can comprise the process of ionically coating the nucleating agent. Embodiments of freeze indicator comprising an ionically coated nucleating agent, as described herein, In this aspect, the invention can provide simple low cost processes which can provide an inorganic nucleating agent with good efficacy, shelf life and/or other properties that can be beneficially employed in freeze indicators according to the invention. Also, the inventive processes can improve the surface hydrophilicity of some nucleating agents while avoiding introducing polar salts into freeze indicator dispersions which might prevent coagulation or adversely affect the pre-frozen stability of the indicator dispersion, in some cases.

Employment of nucleating agents ionically coated by a process according to the invention in freeze indicators comprising indicator dispersions can reduce the potential for supercooling of the dispersion medium. In addition, employment of ionically coated nucleating agents, in accordance with the invention can help provide a narrow difference between the temperature above freezing where the indicator shows no response and the temperature at which freezing will reliably occur and the indicator will respond.

Silver iodide is an example of an inorganic nucleating agent which can usefully be ionically coated and employed in a freeze indicator, by employing a process according to the invention, or by other suitable means to nucleate the formation of ice from an aqueous liquid medium or to nucleate the formation of other solid phases from other liquid media, as will be, or become apparent to a person of ordinary skill in the art.

Liquid medium. Any suitable liquid medium can be used in indicator dispersions employed by freeze indicators according to the present invention. In general, the response temperature of the freeze indicator is related to or, or determined by the choice of liquid medium. However, other factors can also affect the response temperature, some of which are described herein, for example supercooling and nucleating agents, if present.

Unless the context indicates otherwise, the terms "water" and "aqueous" are used in this specification to include not only hydrogen oxide, $H_2O$, but also deuterium oxide, $D_2O$, or heavy water, partially deuterated water, DHO and mixtures of these materials. The concentration of deuterium oxide and/or partially deuterated water can be varied to control the freezing point of the water or aqueous phase with higher concentrations of deuterium oxide raising the response temperature to be closer to the melting point of ice. If desired, up to 100 percent by weight of deuterium oxide can be employed.

Thus, the liquid medium can be aqueous and can consist essentially of water or of deuterium oxide or of a mixture of water and deuterium oxide.

For example, a suitable aqueous liquid medium can, comprise from about 10 percent to about 70 percent based on the weight of the liquid medium, of deuterium oxide, deuterated water or of a mixture of deuterium oxide and deuterated water. One useful embodiment of aqueous liquid medium consists entirely of regular water. Another useful embodiment of aqueous liquid medium consists entirely of deuterium oxide.

The aqueous dispersion can be devoid, or free, of organic liquid, if desired. Furthermore, the liquid medium can be a single phase before, during and after freeze exposure, if desired, except for the presence of a two-phase mixture constituted by the liquid medium which will occur during freezing as the liquid transitions between solid and liquid states. Suitable liquid media can comprise a single liquid, for example water, or a mixture of miscible liquids which do not separate one from the other before, during or after freezing, or after thawing, for example, an aqueous alcoholic mixture.

Some other liquids which can be employed as liquid media in the practice of the invention include, for example, nonaqueous polar or nonpolar liquids, ethanol, propanol, hexane and other lower alkanols and alkanes having ten or fewer carbon atoms, acetone, ethyl acetate, toluene, hexane and other useful organic solvents.

Depending upon the composition of the liquid dispersion medium employed, the freezing temperature indicated can be the freezing point of water, the freezing point of an aqueous solution or of a mixture of liquids or the freezing point of an organic, silicone or other solvent, liquid or liquid mixture, if such is employed in the inventive freeze indicator. Desirably, the liquid medium is a single phase before, during and after freeze exposure.

The invention includes freeze indicators comprising a nonaqueous liquid medium and a nucleating agent to assist or promote freezing of the liquid medium wherein the nucleating agent is insoluble in the liquid medium, has crystallographic properties, such as crystal geometry and size that are related to those of the solid phase of the frozen liquid medium and which is commercially available with relatively large crystals.

Useful crystal sizes for an inorganic ice nucleating agent can comprise an average particle size in a range of from about 1 micron to about 100 micron, for example from about 10 micron to about 40 micron, or can have another suitable size as will be or become apparent to a person of ordinary skill in the art.

Some examples of inorganic nucleating agents that can be employed in the practice of the invention, include inorganic nucleating agents selected from the group consisting of silver iodide, silver bromide, copper iodide, miersite, mica, bentonite, hectorite, fluorophlogopite and mixtures or blends of two or more of the foregoing inorganic nucleating agents. Other suitable inorganic nucleating agents will be, or become, apparent to a person of ordinary skill in the art in light of this disclosure.

Various proportions of nucleating agent can be employed in the indicator dispersion. For example, a proportion of inorganic nucleating agent of at least about 0.1 percent by weight or of from about 1 to about 2 percent by weight can be employed. Both ranges of proportions of inorganic nucleating agent are based upon the weight of the indicator dispersion.

Some illustrative and nonlimiting examples of processes according to the invention and of comparative process will now be described.

COMPARATIVE EXAMPLE A

Commercial Silver Iodide

A freeze indicator dispersion is prepared by introducing 0.15 g silver iodide powder (Alfa Aesar 99.999% pure, product code 12111) with a spatula into a clean glass vial rinsed with deionized water. 7.95 g gold colloid (20 nm gold particles in water, BBInternational product number EM.GC20 at OD2), followed by 1.9 g deuterium oxide (99.9% deuterium from Sigma Aldrich, product number 151882), are pipetted into the same glass vial. The glass vial is sonicated in a sonication bath for 2 minutes and from time to time is shaken manually. The mixture is observed closely to ensure the solid silver iodide material becomes fully dispersed and is not clumped. Shaking and sonication are continued until the solids are homogenously dispersed yielding a pink liquid.

While stirring at medium speed with a magnetic stirring bar twelve 20 µl aliquots of the dispersion are removed from the glass vial using an Eppendorf Pipette and immediately delivered into small polypropylene sample tubes (0.2 ml polypropylene Thermowell™ Tubes from Corning Inc. part number 6571).

The twelve freeze indicator dispersion samples from the previous step are then tested for freeze indicating performance using the following procedure. The samples are placed in a weighted open-weave mesh bag and immersed in a propylene glycol/water circulating cooling bath equipped with a calibrated thermocouple or calibrated thermometer to control the temperature to −2° C. The samples are visually examined for a change in color at regular intervals. The 12 samples employed in this experiment lost their pink color becoming approximately colorless with an average response time of about 25 minutes. This relatively slow response time suggests that untreated commercial silver iodide does not exhibit good freeze indicator nucleation characteristics.

EXAMPLE 1

Commercial Silver Iodide

Comparative Example A is repeated with the difference that, before incorporation into the freeze indicator dispersion, the silver iodide is added to a 0.01 molar sodium chloride solution in a proportion of 1 g of silver iodide per 100 ml of sodium chloride solution and agitated for two hours at room temperature to provide an ionic coating on the silver iodide. The mixture is filtered to remove the sodium chloride solution and the silver iodide residue is dried under vacuum at room temperature. The dried product is then incorporated into a freeze indicator dispersion, and tested, as is described in Comparative Example A. The mean response time for the twelve samples, when the sample changes appearance from clear to approximately colorless is about 3 minutes. The test is repeated on a sample aged for one week at room temperature. The mean response time for the 12 samples is again 3 minutes. This result suggests that the ionically coated silver iodide can perform as an efficient and stable nucleating agent in the freeze indicator dispersion tested. The nucleating properties appear to be maintained after aging for one week suggesting the dispersion may have good shelf life.

COMPARATIVE EXAMPLE B

Melt Ground Silver Iodide

Silver iodide for use as a nucleating agent is freshly melt ground by melting the silver iodide powder employed in Comparative Example A in a tube furnace under dynamic vacuum. The melt is reduced to room temperature with controlled cooling under vacuum, and then dry ground and dry sieved through a series of five wire mesh sieves. The sieves have mesh openings of size number 100, 200, 325, 400 and 635 respectively and are shaken for 5 hours. The graded product comprises five fractions separated by sieve size which have nominal particle sizes of: between about 149 micron and about 74 micron; between about 74 micron and about 44 micron; between about 44 micron and about 37 micron; between about 37 micron and about 20 micron; and less than about 20 micron, respectively.

The resultant ground silver iodide is incorporated into a freeze indicator dispersion and tested as described in Comparative Example A. The test is also repeated on samples aged for one week at room temperature. Four of the five fractions give freeze indicator samples that freeze within about 10 minutes suggesting that melt ground silver iodide can have good initial nucleating activity. The remaining fraction, of nominal particle size 20 to 37 microns, gives freeze indicator samples that freeze within about 90 minutes. However, after aging for one week, some samples from each of the silver iodide fractions do not freeze after 2 hours in the cooling bath, suggesting that the initial freeze indicator nucleating properties have declined significantly.

EXAMPLE 2

Melt Ground Silver Iodide

Comparative Example B is repeated with the difference that, before incorporation into the freeze indicator dispersion, the silver iodide is treated with sodium chloride in the manner described in Example 1. The ionically coated melt ground silver iodide also exhibits better initial nucleating activity than the uncoated product. Samples made from the 20 to 37 micron fraction all freeze within 10 minutes. After aging for one week, samples made from the 20 to 37 micron fraction all freeze within 10 minutes, suggesting that the freeze nucleating activity is maintained.

EXAMPLE 3

Potassium Chloride

Examples 1 and 2 are repeated employing potassium chloride in place of sodium chloride. Nearly similar results are obtainable although sodium chloride appears marginally superior to potassium chloride.

EXAMPLE 4

Freeze Indicator Dispersion

A freeze indicator dispersion which can be prepared by the method described in Comparative Example A comprises, by weight, based on the weight of the dispersion, 1.5 percent of silver iodide nucleating agent to control the freeze response, 19.0 percent of deuterium oxide to adjust the freezing point and 79.5 percent of gold colloid suspension to indicate freezing. The several ingredients can be the products sourced from the suppliers referenced in Comparative Example A, or other suitable products. The silver iodide can be ionically coated silver iodide prepared as described in any one of Examples 1 to 3, or another nucleating agent described herein as suitable for the practice of the invention. The freeze indicator dispersion can usefully be employed in the freeze indicators described herein.

Nucleating agents can also be provided for nonaqueous liquid media, including liquid media that have some hydrophobic character or include one or more polar or nonpolar organic components, as is further described elsewhere herein.

In another aspect the invention provides a nucleating agent coating process comprising coating the nucleating agent with a coating fluid comprising a surface coating material, selected to provide a surface coating on the nucleating agent that can enhance the compatibility of the nucleating agent with the liquid medium. For example a hydrophobic coating agent, such as a titanate or the like can be employed for compatibility with a hydrophobic liquid medium or a polar organic coating agent can be employed for compatibility with an alcoholic or other polar organic solvent or alkoxypolysiloxanes can be employed as coating agents for compatibility with a silicone fluid liquid medium. The coating process can comprise steeping the nucleating agent in the coating fluid, optionally, for at least 30 minutes.

If desired, the coating process can include separating the coated nucleating agent from the coating fluid and subsequent incorporation of the coated nucleating agent into the indicator dispersion. Optionally, the coating process can include drying the coated nucleating agent followed by incorporating the coated nucleating agent into the indicator dispersion. The invention also includes a process of making a freeze indicator which comprises a coating process as described herein.

Freeze indicators according to the invention and processes of making them can employ indicator particles comprising a material selected from the group consisting of pigments, ink pigments, minerals, unreactive metals, noble metals, precious metals, gold, gold alloys, silver, aluminum, iridium, platinum, metal-coated pigments, core-shell particles, metal nanoshells, zinc, selenium, carbon black, sulfur, ferric oxide, kaolinite, montmorillonite, talc, halloysite, calcite (calcium carbonate), dolomite (calcium carbonate, magnesium carbonate), rutile titanium dioxide, gibbsite (aluminum hydroxide), zincite (zinc oxide), chromium oxide, barite (barium sulfate), crystalline silica, amorphous silica, hydrated silica, fluorite (calcium fluoride), hydroxyapatite, white and colored polystyrene beads, both white and colored plastic and synthetic polymeric particles, both white and colored hollow, plastic and synthetic polymeric particles, combinations of any two or more of the foregoing materials comprising a coating of one material upon the other and mixtures of any two or more of the foregoing materials.

Any suitable proportion of indicator particles can be provided in the freeze indicator dispersion. For example the indicator dispersion can comprise a proportion of indicator particles in the range of from about 0.0001 to about 10 percent by weight based upon the weight of the indicator dispersion. In some cases, higher proportions of indicator particles can be employed if desired.

In a further aspect of the present invention described herein various organic particulate materials can be employed as indicator solids in freeze indicator dispersions.

Some suitable organic indicator particle materials employed in the freeze indicator dispersions of the invention can yield a post-freezing appearance which, though satisfactory for some purposes, is insufficiently distinguished from the initial, pre-freezing appearance of the indicator dispersion in some cases, for example, in cases where an enhanced contrast is desired. An example of a material that may provide weak contrast is a light-colored or white wax, especially a somewhat transparent wax or low opacity wax.

As described herein, such problems can be ameliorated by including a softener for the organic particulate material in the indicator dispersion. The softener can be blended or otherwise intimately admixed with the organic material, if desired, to provide homogenous particles of solid material dispersed in the liquid medium. Upon freezing, the relatively soft particles can coalesce irreversibly into clumps or aggregates that can lend the indicator dispersions a distinctly different appearance after freezing from the initial appearance, before freezing.

The use of a softener according to the invention can enable an enhanced indicator appearance to be obtained without employing dyes or pigments which could leach into the dispersion medium and interfere with the visual response to freezing. For example, after freezing the softened solid organic particles can be coalesced into several large masses, or a single mass, of relatively high opacity, compared with the opacity of the indicator dispersion before freezing. Such a high opacity mass or masses of coalesced particles can provide a strong visual signal by obscuring an obscurable background for example a white or light-colored, reflective, background or a background bearing a pattern, an image or a graphic, a check mark or words or other desired appearance.

Suitable organic indicator materials include certain waxes, some polymeric material and particulate materials employed in latexes as well as other organic materials as will be apparent to a person of ordinary skill in the art. Some examples of suitable organic particulate materials include natural and synthetic rubbers, synthetic polymers such as styrene, vinyl and vinylidene polymers and copolymers, and waxes. The term "latex" is used herein to include dispersions of solid organic particles in aqueous or other liquid media which have an opaque appearance. Some useful latexes have a milky appearance. Some latexes useful in the practice of the invention can include a surface-active agent or surfactant to stabilize the dispersion.

The invention can employ latex indicator dispersions which are either initially translucent and become opaque or display another distinctive appearance after freezing or are initially opaque and which coagulate upon freezing to provide transparent regions of the dispersion through which a colored or other distinctive background can be viewed.

Freeze indicators employing dispersions of such organic particulate materials as indicators can comprise an aqueous dispersion medium as described herein, or another suitable liquid dispersion medium, as will be apparent to a person of ordinary skill in the art.

Suitable indicator dispersions comprising organic particulate particles can also comprise a nucleating agent, if desired. Optionally, the nucleating agent can be ionically coated as is described herein. In this aspect of the invention, any one of a variety of nucleating agents can be employed. For example, the nucleating agent can be selected from the group consisting of silver iodide, silver bromide, copper iodide, miersite, mica, bentonite, hectorite, fluorophlogopite, a nucleating protein, a nucleating microorganism, *Pseudomonas syringae* microorganisms, *Pseudomonas syringae* nucleating proteins, an ice nucleating protein, ice nucleating particles and mixtures of two or more of the foregoing nucleating agents.

Some examples of waxes or waxy materials that are suitable for use as organic indicator particle materials in freeze indicators according to the invention include wax materials selected from the group consisting of paraffin wax, microcrystalline wax, carnauba wax, beeswax, Chinese wax, shellac wax, spermaceti, tallow, palm wax, soy wax, lanolin, wool grease, waxy polymers, waxy copolymers a polyolefin, polyethylene, polypropylene, an ethylene-vinyl acetate copolymer, an ethylene-acrylic acid copolymer and mixtures of any two or more of the foregoing waxy materials.

Waxes having a melting point in a suitable range, for example in the range of from about 40° C. to about 80° C., or in another suitable range, for example from about 0° C. to about 100° C. can be employed as the organic indicator material if desired. Desirably, the wax is solid in the frozen state of the liquid medium or at room and ambient temperatures as well as in the frozen state of the medium. Alternatively, or additionally, suitable waxes can have a softness indicated by penetration data characteristics. For example, indicator particles formed of organic material can have a softness of at least about 20 dmm or at least about 30 dmm. Materials with other appropriate softnesses, for example a softness of at least about 10 dmm, or with appropriate softnesses determined by another test, can be employed, as will be apparent to a person of ordinary skill in the art. The softnesses described herein are intended to be determined according to the ASTM D1321 Needle Penetration Test at 25° C.

The term "wax" is used herein to include paraffin waxes, sometimes known as "paraffins". Waxes suitable for employment in the practice of the invention include, without limitation, individual, mixed and blended hydrocarbons that are solid at room temperature and can be crystalline or microcrystalline.

Although the invention is not intended to be so limited, it is believed that appropriate choice of a wax, wax blend and possibly wax blend ratio can help provide a desired appearance change. Waxes and wax blends that are soft may coagulate more readily than hard waxes or wax blends. Also, waxes, or other organic materials, having some polar functionality are believed to facilitate coagulation of the indicator particles into a mass that retains water and has good opacity characteristics. It will be understood that the presence of large masses, bodies, or agglomerations of indicator particles that have good opacity, in the post-freezing condition of a freeze indicator according to the invention can help provide a post-freezing appearance of the indicator which is clearly distinguished from the pre-freezing appearance. A clear distinction can help a viewer, or a viewing device, read the indicator without error.

Relatively simple, well defined and commonly available organic particulate materials, such for example as the waxes and certain of the hydrophobic polymers described herein, can be useful for mass producing freeze indicators according to the invention. Such waxes and polymers can facilitate quality control, consistency and economy of the product.

The softener for the wax indicator material can comprise a wax softener selected from the group consisting of an ethylene-vinyl acetate copolymer, an ethylene-acrylic acid copolymer, a microcrystalline wax, polyethylene, cholesterol, short-chain alkanes, paraffinic oil, naphthenic oil, aromatic oil, glycerol, mineral oil, a fatty acid, a fatty-acid derivative, a fatty alcohol, a fatty acid ester, a hydrogenated and partially hydrogenated fatty acid, a hydrophilic softener and a hydrophilic long-chain hydrocarbon comprising at least one ester group.

Freeze indicators according to the invention can comprise a proportion of the softener of from about 5 to about 50 percent by weight or of from about 20 to about 30 percent by weight, both ranges of proportions of softener being based upon the combined weights of the softener and the organic material.

In a further aspect of the invention, the indicator particles can comprise liquid droplets. For example, the liquid medium can comprise an aqueous medium as described herein and the liquid droplets can comprise a material immiscible therewith. Some suitable liquids include oligomers, low molecular weight polymers and short-chain hydrocarbons. The liquid optionally has a molecular weight of not more than about 200 daltons.

Any suitable organic material can be employed as the indicator material. For example, the organic indicator material can comprise a soft solid or a semi-solid material selected from the group consisting of rubbery polymers, styrene-butadiene latex, natural rubber latex, rubbery polyurethane, rubbery acrylic polymers and copolymers, rubbery nitrile polymers and copolymers, rubbery polychloroprene, rubbery vinyl pyridine polymers, rubbery styrene polymers, rubbery styrene/butadiene copolymers, rubbery styrene/acrylic acid copolymers, rubbery vinyltoluene/tertiarybutyl styrene copolymers, rubbery vinylidene chloride/vinyl chloride copolymers and mixtures of two or more of the foregoing polymeric materials. selected from the group consisting of rubbery polymers, styrene-butadiene latex, natural rubber latex, rubbery polyurethane, and rubbery acrylic polymers.

The term "rubbery" is used herein to include materials resembling natural rubber, resilient materials and elastomeric materials.

If desired, the organic indicator material can have a glass transition temperature below about 20° C. or below the liquid medium frozen state melting point. Alternatively, the organic indicator material can have a glass transition temperature above about 20° C. If desired, the organic material softener can comprise a plasticizer.

The organic indicator material can also comprise a mixture of crystalline and non-crystalline materials, for example a suitable wax and a suitable rubbery polymer such as are described herein.

The organic indicator material can have any suitable particle size and concentration. For example, the particle size and concentration of the organic indicator material can be selected to help provide a freeze indicator dispersion which is relatively clear before freezing and relatively opaque after freezing, or after freezing and thawing. By employing relatively larger particles in the indicator dispersion, a more opaque post-freezing appearance can be obtained in some embodiments of the invention. Indicator dispersions with unduly large particles may be unstable and prone to coagulate before freezing, may lack clarity or may have undesirable opacity.

A suitable proportion of organic material indicator particles employed in a freeze indicator according to the invention can, for example, comprise a proportion of the indicator dispersion of from about 5 to about 60 percent by weight or of from about 20 to about 30 percent by weight, based upon the weight of the indicator dispersion.

A wide variety of organic indicator material particle sizes can be employed in practicing the present invention. The average particle size of the organic indicator material can be selected according to the desired initial appearance of the indicator dispersion. Thus, an indicator dispersion that is initially transparent and which becomes opaque after being frozen can employ organic indicator particles having an average particle size of less than about 400 nm, desirably less than about 300 nm, for example, an average particle size in the range of from about 10 nm to about 100 nm or of from about 20 nm to about 50 nm.

On the other hand, an indicator dispersion that is initially opaque and exhibits transparency after being frozen can employ organic indicator particles having an average particle size of greater than about 400 nm, for example an average particle size of greater than about 600 nm.

Dispersion Stabilization. For many commercial purposes, it would be useful to have a freeze indicator employing a coagulatable dispersion which shows good stability at room and other ambient temperatures that freeze-sensitive products are likely to encounter, including temperatures just above freezing, and which can nevertheless coagulate quickly and reliably, with loss of dispersion stability, when it is exposed to a freezing temperature. These requirements tend to oppose each other. Some conventional dispersion and emulsion stabilizers may be overly effective and may interfere with coagulation of the dispersion at freezing.

Accordingly, as described herein, the present invention also provides freeze indicators having freeze indicator dispersions comprising temperature-sensitive stabilizers and stabilizer systems which are helpful to these ends. The freeze indicator dispersions can include a nucleating agent which is organic, inorganic, or a mixture of both inorganic and organic nucleating agents as well as the temperature-sensitive stabilizer. The nucleating agent can be ionically coated, as described herein, or in another suitable manner, if desired.

The invention includes freeze indicators which, to avoid interference with coagulation, employ a dispersion stabilizer or stabilizer system that is ineffective, or too weak to support reversible coagulation. The invention also includes freeze indicators that employ a dispersion stabilizer which is effective at temperatures above freezing and a destabilizer which can aid irreversible coagulation upon freezing.

Some temperature-sensitive stabilizers employed in the practice of the invention can inhibit coagulation of the indicator dispersion at temperatures above the liquid medium frozen state melting point yet permit coagulation of the indicator dispersion at the liquid medium frozen state melting point. The temperature-sensitive stabilizer can be employed in a proportion of from about 0.01 percent to about 5 percent by weight of the indicator dispersion, or in another suitable proportion.

If desired, the temperature-sensitive stabilizer can comprise a surfactant and the surfactant type and concentration can be selected to provide desired stability characteristics. For example the surfactant, and surfactant concentration, can be chosen to provide sufficient stabilization to prevent the freeze indicator dispersion, or emulsion, from breaking down prematurely at room temperature or more elevated temperatures which could undesirably limit the shelf life of a freeze indicator. The surfactant, and surfactant concentration, can also, or alternatively, be selected to avoid providing excess stabilization of the dispersion or emulsion, which could enable the dispersion or emulsion to survive one or more freeze/thaw cycles, resulting in a freeze indicator that may fail to indicate a past exposure to a freezing event.

The surfactant can be employed in a concentration calculated to provide less than monolayer coverage of the surfaces of the indicator particles. The term "monolayer" is used herein to refer to a layer which is approximately one molecule thick. As can be understood by a person of ordinary skill in the art in light of this disclosure, concentrations of surfactant appropriate to provide less than monolayer coverage will depend on the surfactant chemistry and molecular geometry as well as the surface area of the solid particles, which is related to the solid particle size and solid particle concentration.

By controlling the proportion of surfactant or other stabilizer to provide less than complete monolayer coverage of the solid indicator particles, for example not more than about 60 percent coverage or not more than about 30 percent coverage, the stabilization efficacy can be limited or controlled. Possibly, although not necessarily, this limitation or control of the stabilization efficacy may occur because hydrophobic or other surface sites adverse to dispersion stability on the solid particle surfaces remain exposed to the liquid medium.

In practice, if a dispersion foams when agitated, it is possible that the proportion of surfactant is more than sufficient for monolayer coverage of the solid particles with surfactant and that excess surfactant is distributed in the liquid medium. If, on the other hand, too little surfactant is present the dispersion may unstable when made or may become unstable over time. If desired, a suitable proportion of surfactant can be employed by determining a minimum quantity which is sufficient to avoid foaming. The so-determined quantity may be close to the quantity that provides monolayer coverage. The determined quantity can then be reduced by a suitable figure, for example by from about 1 percent to about 50 percent. This reduced quantity can then be employed to provide less than monolayer coverage of the solid particles with surfactant. Useful proportions of surfactant can be in the range of from about 0.01 percent to about 1 percent by weight of the indicator dispersion.

While the invention is not limited by this or any other theory it is contemplated that a particle size distribution curve for an indicator dispersion employing approximately monolayer coverage of surfactant will generally be a smooth curve with a single peak, and may be close to Gaussian in shape. In contrast, a particle distribution curve for an indicator dispersion with inadequate surfactant will display a more irregular particle distribution curve, for example a curve having multiple peaks.

In one embodiment of the invention, the temperature-sensitive stabilizer can comprise a nonpolar surfactant and, if desired polar surfactants can be excluded from the dispersion so that no polar surfactant is present.

In some other embodiments of the invention, the surfactant can be selected from the group consisting of nonpolar, anionic, cationic and zwitterionic surfactants.

Some examples of anionic surfactants that can be employed in the practice of the invention include anionic surfactants selected from the group consisting of sodium stearate, potassium stearate, sodium myristate, sodium oleate, sodium dodecyl sulfate, ammonium lauryl sulfate, sodium lauryl ether sulfate, sodium dodecyl 3-mole ether sulfate, sodium dodecyl benzene sulfonate, sodium nonylphenol 2-mole ethoxylate sulfonate, bis(2-ethylhexyl) sodium sulfosuccinate and mixtures of two or more of the foregoing anionic surfactants.

Some examples of cationic surfactants that can be employed in the practice of the invention include cationic surfactants selected from the group consisting of dodecyl trimethyl ammonium chloride, hexadecyl trimethyl ammonium bromide, cetylpyridinium chloride, polyethoxylated tallow amine, benzalkonium chloride, benzethonium chloride and mixtures of two or more of the foregoing cationic surfactants.

Some examples of zwitterionic surfactants that can be employed in the practice of the invention include zwitterionic surfactants selected from the group consisting of lauryl amido propyl dimethyl betaine, dodecyl betaine, dodecyl dimethylamine oxide, cocamidopropyl betaine, coco amphoglycinate and mixtures of two or more of the foregoing zwitterionic surfactants.

Some examples of nonpolar surfactants that can be employed in the practice of the invention include nonpolar surfactants selected from the group consisting of fatty acid ethoxylates, sorbitan esters, sorbitan ester derivatives, sorbitan monolaurate, copolymers of poly(ethylene oxide) and poly(propylene oxide), fatty alcohols, cetyl alcohol, oleyl alcohol and mixtures of two or more of the foregoing nonpolar surfactants.

Many factors can affect the reliability and responsiveness of a freeze indicator. One such factor is the pH of the liquid medium which can affect stabilizer or surfactant behavior and coagulation. Accordingly, the present invention can utilize pH considerations to provide temperature-sensitive stabilizers, and freeze indicators comprising the temperature-sensitive stabilizers, which can help address desired stability objectives.

Also, the presence of soluble salts in the liquid medium can sometimes be detrimental to dispersion or emulsion stability and can affect coagulation. Nevertheless, the present invention includes aspects which utilize soluble salts.

Thus, to provide a temperature-sensitive stabilizer with limited dispersion stabilization properties, freeze indicators according to the invention can comprise a surfactant having enhanced efficacy in a specified pH range, the indicator dispersion having a pH outside the specified pH range.

For example, where the freeze indicator dispersion employs a nonpolar surfactant, the specified pH range can be from about pH 6 to about pH 8 and the indicator dispersion can have a pH of less than about 5 or greater than about 9.

Where the freeze indicator dispersion employs an anionic surfactant, the specified pH range can be above about pH 7 and the indicator dispersion can have a pH of less than about 6.

Where the freeze indicator dispersion employs a cationic surfactant, the specified pH range can be below about pH 7 and the indicator dispersion can have a pH of greater than about 8.

In another aspect, the invention provides a freeze indicator wherein the indicator dispersion comprises a low-temperature destabilizer, as a component of the temperature-sensitive stabilizer, to promote freeze-related coagulation without causing premature coagulation at temperatures above the liquid medium frozen state melting point or a desired response temperature, should that be different from the melting point.

The low-temperature destabilizer usefully can be present in any suitable proportion, for example, a proportion by weight relative to the proportion of temperature-sensitive stabilizer of from about 0.2 to 1 to about 1 to 1.3.

The low-temperature destabilizer can comprise any suitable material which can be employed in an inventive freeze indicator to promote or enhance coagulation of the freeze indicator dispersion, without unacceptably impairing warm temperature stability properties of the dispersion. For example, the low-temperature destabilizer can comprise a salt, such as a salt selected from the group consisting of inorganic salts, monovalent salts, chlorides, potassium chloride, sodium chloride, lithium chloride, multivalent salts, multivalent chlorides, calcium chloride, magnesium chloride, zinc chloride and aluminum chloride.

The low-temperature destabilizer can have any of a variety of characteristics that will suit it to a particular freeze indicator system. For example, in freeze indicators employing a polar temperature-sensitive stabilizer the low-temperature destabilizer can carry a charge opposite to the charge of the temperature sensitive stabilizer.

If desired, the low-temperature destabilizer can have a high molecular weight and can be a cationic, anionic, zwitterionic or an uncharged compound or compounds, for example a polymer. In this context, as used herein, the term a "high molecular weight" includes a molecular weight in the range of from about 1,000 to about 100,000 daltons.

Some examples of useful low-temperature destabilizers include high molecular weight polyacrylamides, high molecular weight polyvinyl alcohols, high molecular weight polyvinyl pyrrolidones, high molecular weight polyacrylic acids or a mixture of two or more of the foregoing polymers.

In a freeze indicator according to the invention which employs indicator particles comprising a wax material and which has an indicator dispersion comprising an anionic surfactant and a low-temperature destabilizer, some examples of materials the low-temperature destabilizer can comprise include a cationic polymer, a cationically modified hydroxyethyl cellulose polyquaternium-4, a low molecular weight cationically charged polymeric flocculant and mixtures of the foregoing.

In a freeze indicator according to the invention which employs indicator particles comprising a wax material and which has an indicator dispersion comprising a cationic surfactant and a low-temperature destabilizer, the low-temperature destabilizer some examples of materials the low-temperature destabilizer can comprise include an anionic polymer, a polyacrylic acid, a polymethacrylic acid and a mixture of two or more of the foregoing low-temperature destabilizers.

In a freeze indicator according to the invention which employs indicator particles comprising a wax material and which has an indicator dispersion comprising a zwitterionic surfactant and a low-temperature destabilizer, the low-temperature destabilizer some examples of materials the low-temperature destabilizer can comprise include a cationic, anionic or zwitterionic surfactant or a mixture of two or more of the foregoing low-temperature destabilizers.

Embodiments of freeze indicator according to the invention described herein can provide a clear visual signal in response to a defined freeze exposure event. The defined freeze exposure event can, for example be exposure to a particular temperature or temperature interval for a specific time interval. Desirably, most, if not all, of a production batch of freeze indicators can respond to the defined temperature event providing a desired visual signal. For example, in the case of monitoring of the freezing point of water, the defined temperature event can be one hour at $-2°$ C.$\pm 0.2°$ C. Other temperature events can of course be defined or selected to suit particular purposes, including for example, shorter time intervals such as 30 minutes or 10 minutes and other temperature brackets, for example, from about $-2°$ C. to about $-3°$ C. It is contemplated that the indicated freezing or near-freezing temperature event will be exposure to a temperature within a few degrees of the freezing point of water for example a temperature in the range of from about $-10°$ C. to about $5°$ C.

Desirable consistency can comprise a satisfactory visual response from at least about 90% of freeze indicator units in a batch or sample. Higher consistencies, for example 99% or 99.9% can also be useful.

Freeze indicators according to the invention can be employed to indicate the actual historical exposure, or an event associated with potential exposure, of a host product to a freezing temperature.

The invention includes useful embodiments which are small, low-cost freeze indicators that can be mass produced and provide a consistent response from one indicator to the next. Such small freeze indicators according to the invention may have rather small indicator volumes measurable in, for example microliters or tens of microliters. For example, the indicator volume occupied by the indicator dispersion can be in the range of from about 3 µl to about 50 µl or can have another suitable capacity. Notwithstanding the shortness of the light path through the liquid medium, the invention provides active indicator elements which can give a good visual signal of freeze exposure, for example by exhibiting a pronounced change in opacity, reflectivity, or both as a result of freeze exposure.

Freeze indicators responsive to other temperatures than the freezing point or other exposure durations can also be provided, as will be apparent to those skilled in the art in light of this disclosure. Furthermore, in light of this disclosure, those skilled in the art can understand how to provide indicators responsive to other temperatures depressed below ambient, which other temperatures may or may not correspond with the freezing point of a particular material.

As can be understood from this description, various embodiments of freeze indicator according to the invention can provide various benefits. For example, embodiments of the invention can provide small, low cost, freeze indicators suitable for mass production and for attachment to a wide range of host products, and which can reliably signal freeze exposure. Embodiments of the invention can also provide freeze indicators having low cost, efficient inorganic nucleating agents which avoid complexity, expense and other drawbacks may be associated with use of biologicals or microorganisms as nucleating agents, if desired and yet can control supercooling. Embodiments of the invention can furthermore provide freeze indicators providing a visual signal with enhanced visual intensity, a low rate of false positives or of false negatives, and which provide a reliable and reproducible signal of past freeze exposure.

The invention includes a freeze-sensitive host product, for example a vaccine, a medication or a foodstuff, comprising a freeze indicator or process according to the invention. The freeze indicator can be associated with the host product to indicate possible exposure of the host product to a temperature at or near the liquid medium frozen state melting point. For example, the freeze indicator can be attached to the host product by an adhesive-coated substrate which supports the freeze indicator. Such a construction and other constructions of freeze indicator, including flexible freeze indicators, and means for association with, or attachment of freeze indicators to host products, as well as a variety of host products, are all described in the Taylor et al. patent publications. Such constructions, arrangements and methods can be employed in practicing the present invention, if desired.

Disclosures Incorporated. The entire disclosure of each and every U.S. patent and patent application, each foreign and international patent publication, of each other publication and of each unpublished patent application that is specifically referenced in this specification is hereby incorporated by reference herein, in its entirety.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. Should there appear to be conflict between the meaning of a term as used in the written description of the invention in this specification and the usage in material incorporated by reference from another document, the meaning as used herein is intended to prevail.

Throughout the description, where compositions are described as having, including, or comprising specific components, or where processes are described as having, including, or comprising specific process steps, it is contemplated that compositions of the present invention can also consist essentially of, or consist of, the recited components, and that the processes of the present invention can also consist essentially of, or consist of, the recited processing steps. It should be understood that the order of steps or order for performing certain actions is immaterial so long as the invention remains operable. Moreover, two or more steps or actions may be conducted simultaneously. In addition, all proportions recited herein are to be understood to be proportions by weight, based upon the weight of the relevant composition, unless the context indicates otherwise.

The embodiments of the invention described herein are illustrative and it is to be understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A freeze indicator comprising an indicator dispersion having an initial appearance, the indicator dispersion comprising:
    (a) an aqueous liquid medium having a melting point determined from the frozen state of the liquid medium;
    (b) solid indicator particles comprising an organic material and a softener to soften the indicator particles at the aqueous liquid medium melting point, wherein the softener is intimately admixed with the organic material and the indicator particles have a softness of at least about 20 dmm, as determined at 25° C. by Needle Penetration Test ASTM D1321, and are dispersed in the liquid medium; and
    (c) a particulate nucleating agent to inhibit supercooling of the liquid medium below the liquid medium melting point;
    wherein in the frozen state of the liquid medium the indicator particles are coalesced providing the indicator dispersion with a different appearance from the initial appearance and the coalescence and the different appearance are irreversible.

2. A freeze indicator according to claim 1 wherein the organic material comprises a wax material selected from the group consisting of a paraffin wax, a microcrystalline wax, carnauba wax, beeswax, Chinese wax, shellac wax, spermaceti, tallow, palm wax, soy wax, lanolin, wool grease, and mixtures of any two or more of the foregoing wax materials.

3. A freeze indicator according to claim 2 wherein the softener comprises a wax softener selected from the group consisting of an ethylene-vinyl acetate copolymer, an ethylene-acrylic acid copolymer, a microcrystalline wax, polyethylene, cholesterol, short-chain alkanes, paraffinic oil, naphthenic oil, aromatic oil, glycerol, mineral oil, a fatty acid, a fatty-acid derivative, a fatty alcohol, a fatty acid ester, a hydrogenated fatty acid, a partially hydrogenated fatty acid, a lipid, a hydrophilic softener and a hydrophilic long-chain hydrocarbon comprising at least one ester group.

4. A freeze indicator according to claim 1 wherein the organic material comprises a soft solid or a semi-solid material selected from the group consisting of rubbery polymers, styrene-butadiene latex, natural rubber latex, rubbery polyurethane, rubbery acrylic polymers and copolymers, rubbery nitrile polymers and copolymers, rubbery polychloroprene, rubbery vinyl pyridine polymers, rubbery styrene polymers, rubbery styrene/butadiene copolymers, rubbery styrene/acrylic acid copolymers, rubbery vinyltoluene/tertiary-butylstyrene copolymers, rubbery vinylidene chloride/vinyl chloride copolymers and mixtures of two or more of the foregoing polymeric materials.

5. A freeze indicator according to claim 4 wherein the softener comprises a plasticizer and the organic indicator material has a glass transition temperature below about 20° C. or below the liquid medium frozen state melting point or has a glass transition temperature above about 20° C.

6. A freeze indicator according to claim 1 wherein the indicator particles have a softness of at least about 30 dmm.

7. A freeze indicator according to claim 1 wherein the liquid medium is aqueous and the nucleating agent comprises ice-nucleating particles.

8. A freeze indicator according to claim 7 wherein the nucleating agent is selected from the group consisting of an ice-nucleating protein, an ice-nucleating microorganism, *Pseudomonas syringae* microorganisms, *Pseudomonas syringae* nucleating proteins, and mixtures of two or more of the foregoing nucleating agents.

9. A freeze indicator according to claim 1 wherein the indicator dispersion comprises a dispersion stabilizer wherein the dispersion stabilizer inhibits coagulation of the indicator dispersion at temperatures above the liquid medium frozen state melting point and permits coagulation of the indicator dispersion at the liquid medium frozen state melting point.

10. A freeze indicator according to claim 9 wherein the indicator dispersion comprises a high-molecular weight, low-temperature destabilizer to promote freeze-related coagulation without causing premature coagulation at temperatures above the liquid medium frozen state melting point wherein the low-temperature destabilizer has a molecular weight in the range of from about 1,000 to about 100,000 dalton.

11. A freeze indicator according to claim 1 wherein the indicator dispersion comprises a proportion of indicator particles of from about 5 to about 60 percent by weight based upon the weight of the indicator dispersion and a proportion of nucleating agent of at least about 0.1 percent by weight based upon the weight of the indicator dispersion.

12. A freeze indicator according to claim 3 wherein the liquid medium is aqueous, the nucleating agent comprises an ice-nucleating protein, the indicator dispersion comprises a proportion of indicator particles of from about 5 to about 60 percent by weight and a proportion of ice-nucleating protein of at least about 0.01 percent by weight, both ranges of proportions of ice-nucleating protein being based upon the weight of the indicator dispersion, and the indicator particles have a softness of at least about 20 dmm.

13. A freeze indicator according to claim 1 comprising a proportion of the softener of from about 5 to about 50 percent by weight based upon the combined weights of the softener and the organic indicator material.

14. A freeze indicator according to claim 10 wherein the dispersion stabilizer comprises a nonpolar surfactant and no polar surfactant is present.

15. A freeze indicator according to claim 10 wherein the dispersion stabilizer comprises a surfactant in a concentration calculated to provide less than monolayer coverage of the surfaces of the indicator particles.

16. A freeze indicator according to claim 10 wherein the dispersion stabilizer comprises a surfactant having enhanced efficacy in a specified pH range and wherein the indicator dispersion has a pH outside the specified pH range.

17. A freeze indicator according to claim 16 wherein the surfactant is nonpolar, the specified pH range is from about pH 6 to about pH 8 and the indicator dispersion has a pH of less than about 5 or greater than about 9.

18. A freeze indicator according to claim 16 wherein the surfactant is anionic, the specified pH range is above about pH 7 and the indicator dispersion has a pH of less than about 6.

19. A freeze indicator according to claim 16 wherein the surfactant is cationic, the specified pH range is below about pH 7 and the indicator dispersion has a pH of greater than about 8.

20. A freeze indicator according to claim 10 wherein the low-temperature destabilizer is present in a proportion by weight relative to the proportion of dispersion stabilizer of from about 0.2 to 1 to about 1 to 1.3.

21. A freeze indicator according to claim 20 wherein the dispersion stabilizer is polar and the low-temperature destabilizer carries a charge opposite to the charge of the dispersion stabilizer.

22. A freeze indicator according to claim 20 wherein the low-temperature destabilizer is a cationic, anionic, zwitterionic or an uncharged compound or compounds.

23. A freeze indicator according to claim 20 wherein the low-temperature destabilizer comprises a high molecular weight polyacrylamide, a high molecular weight polyvinyl alcohol, a high molecular weight polyvinyl pyrrolidone, a high molecular weight polyacrylic acid or a mixture of two or more of the foregoing compounds.

24. A freeze indicator according to claim 10 wherein the indicator particles comprise a wax material, the indicator dispersion comprises an anionic surfactant, and the low-temperature destabilizer comprises a cationic polymer, a cationically modified hydroxyethyl cellulose polyquaternium-4, or a low molecular weight cationically charged polymeric flocculant.

25. A freeze indicator according to claim 10 wherein the indicator particles comprise a wax material, the indicator dispersion comprises a cationic surfactant, and the low-temperature destabilizer comprises an anionic polymer, a polyacrylic acid or a polymethacrylic acid or a mixture of two or more of the foregoing low-temperature destabilizers.

26. A freeze indicator according to claim 10 wherein the indicator particles comprise a wax material, the indicator dispersion comprises a zwitterionic surfactant, and the low-temperature destabilizer comprises a cationic, anionic or zwitterionic surfactant or a mixture of two or more of the foregoing low-temperature destabilizers.

27. A freeze indicator according to claim 10 wherein the dispersion stabilizer comprises an anionic surfactant selected from the group consisting of sodium stearate, potassium stearate, sodium myristate, sodium oleate, sodium dodecyl sulfate, ammonium lauryl sulfate, sodium lauryl ether sulfate, sodium dodecyl 3-mole ether sulfate, sodium dodecyl benzene sulfonate, sodium nonylphenol 2-mole ethoxylate sulfonate, bis(2-ethylhexyl)sodium sulfosuccinate and mixtures of two or more of the foregoing anionic surfactants.

28. A freeze indicator according to claim 10 wherein the dispersion stabilizer comprises a cationic surfactant selected from the group consisting of dodecyl trimethyl ammonium chloride, hexadecyl trimethyl ammonium bromide, cetylpyridinium chloride, polyethoxylated tallow amine, benzalkonium chloride, benzethonium chloride and mixtures of two or more of the foregoing cationic surfactants.

29. A freeze indicator according to claim 10 wherein the dispersion stabilizer comprises a zwitterionic surfactant selected from the group consisting of lauryl amido propyl dimethyl betaine, dodecyl betaine, dodecyl dimethylamine oxide, cocamidopropyl betaine, coco amphoglycinate and mixtures of two or more of the foregoing zwitterionic surfactants.

30. A freeze indicator according to claim 10 wherein the dispersion stabilizer comprises a nonpolar surfactant selected from the group consisting of fatty acid ethoxylates, sorbitan esters, sorbitan ester derivatives, sorbitan monolaurate, copolymers of poly(ethylene oxide) and poly(propylene oxide), fatty alcohols, cetyl alcohol, oleyl alcohol and mixtures of two or more of the foregoing nonpolar surfactants.

31. A freeze indicator according to claim 1 wherein the liquid medium is an aqueous liquid medium consisting essentially of water or of deuterium oxide or of a mixture of water and deuterium oxide, wherein the organic particles having a softness of at least about 20 dmm, and wherein the indicator dispersion comprises a polar dispersion stabilizer, and a high-molecular weight, low-temperature destabilizer carrying a charge opposite to the charge on the dispersion stabilizer to promote freeze-related coagulation, the low-temperature destabilizer having a molecular weight in the range of from about 1,000 dalton to about 100,000 dalton.

32. A freeze indicator according to claim 31 wherein the dispersion stabilizer is an anionic surfactant and the low-temperature destabilizer carries a cationic charge or the dispersion stabilizer is a cationic surfactant and the low-temperature destabilizer carries an anionic charge.

33. A freeze indicator according to claim 1 in combination with a freeze-sensitive host product, the freeze indicator being associated with the host product to indicate possible exposure of the host product to a temperature at or near the liquid medium melting point.

34. A freeze indicator according to claim 1 wherein the nucleating agent comprises an ice-nucleating protein.

35. A freeze indicator according to claim 7 wherein the liquid medium consists essentially of water or of deuterium oxide or of a mixture of water and deuterium oxide.

36. A freeze indicator according to claim 10 comprising a proportion of dispersion stabilizer of from about 0.01 percent to about 5 percent by weight based on the weight of the indicator dispersion.

37. A freeze indicator according to claim 15 wherein the surfactant is selected from the group consisting of nonpolar, anionic, cationic and zwitterionic surfactants.

38. A freeze indicator according to claim 1 wherein the organic material comprises a wax having a melting point in the range of from about 40° C. to about 80° C.

39. A freeze indicator according to claim 1 wherein the indicator particles are solid particles of homogenous material.

40. A freeze indicator according to claim 1 wherein the organic material comprises a wax material selected from the group consisting of a waxy polymer, a waxy copolymer, a waxy polyolefin, a waxy polyethylene, a waxy polypropylene, a waxy ethylene-vinyl acetate copolymer, a waxy ethylene-acrylic acid copolymer and mixtures of any two or more of the foregoing wax materials.

41. A freeze indicator according to claim 1 wherein the indicator dispersion comprises a proportion of indicator particles of from about 10 to about 20 percent by weight based upon the weight of the indicator dispersion and a proportion of nucleating agent of from about 1 percent to about 2 percent by weight based upon the weight of the indicator dispersion.

42. A freeze indicator according to claim 1 comprising a proportion of the softener of from about 20 to about 30 percent by weight based upon the combined weights of the softener and the organic indicator material.

43. A freeze indicator according to claim 2 wherein the indicator particles lack dyes and pigments.

* * * * *